Jan. 10, 1939.  G. P. EDMONDS  2,143,549
CORK EXTRUDING DEVICE
Filed July 25, 1936
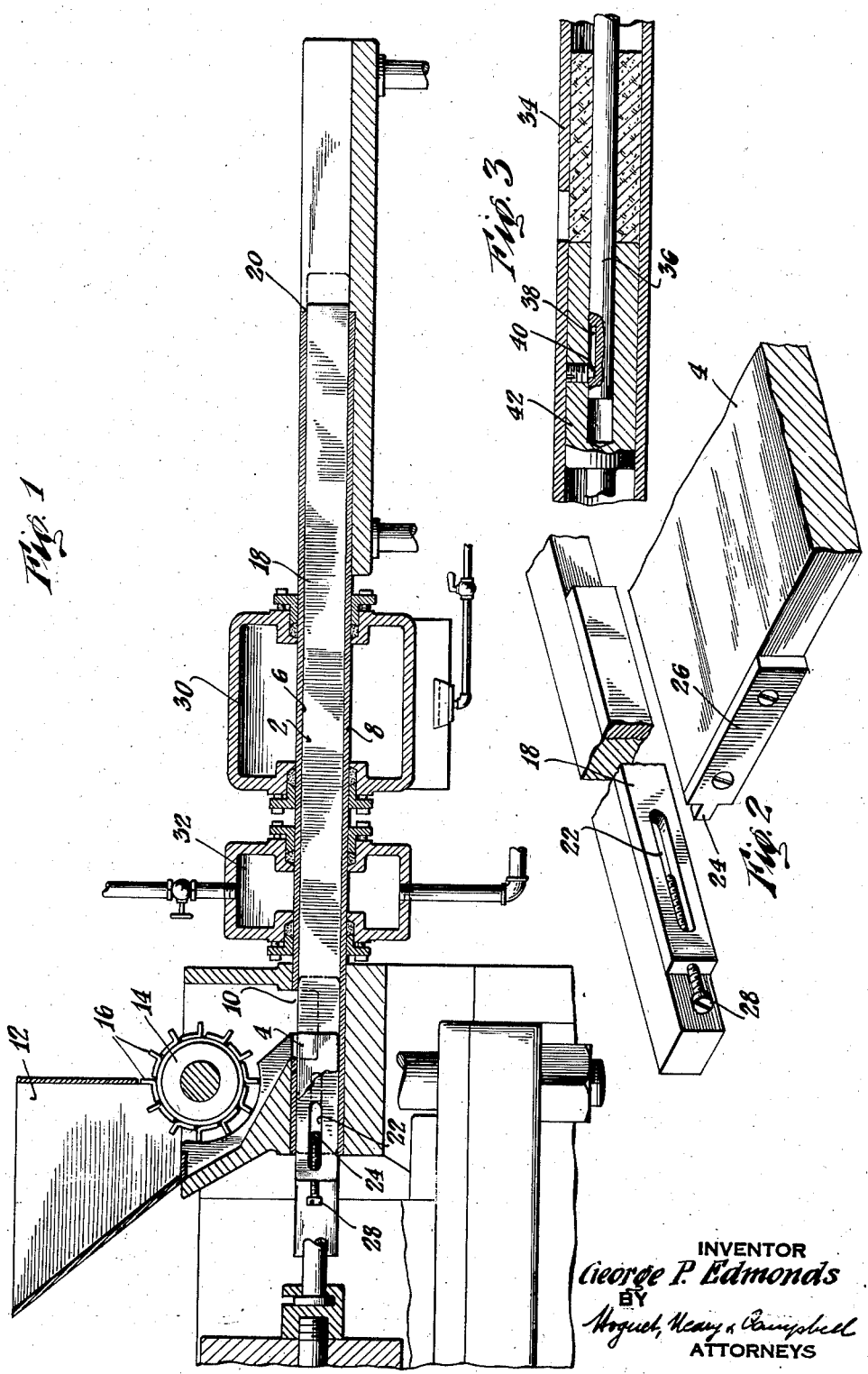
INVENTOR
George P. Edmonds
BY
Hoguet, Neary & Campbell
ATTORNEYS Patented Jan. 10, 1939

2,143,549

UNITED STATES PATENT OFFICE 2,143,549

CORK EXTRUDING DEVICE

George P. Edmonds, Wilmington, Del., assignor to Bond Manufacturing Corporation, Inc., a corporation of Delaware Application July 25, 1936, Serial No. 92,501

22 Claims. (Cl. 18—12)

This invention relates to apparatus for forming materials by extrusion and while it is particularly adapted for producing articles manufactured of comminuted material to which a binder has been added, the invention is of general application and may be employed in extruding other materials.

Heretofore in the extrusion of materials such as comminuted cork to form the same into sheets, rods, tubes and the like, it has been usual to force the cork treated with a binder through a passage of suitable form against the frictional resistance offered by the passage. The passage presents sufficient resistance to movement of the material to produce the necessary pressure thereon to form a product of the desired density whereas the shape of the product is maintained by the setting of the binder. However, an examination of products produced in this manner indicates that the marginal portions or edges of the product are different in density and physical characteristics from the remainder of the product and often show a tendency to split, presumably due to the fact that friction between the material and the walls of the passage through which it is extruded causes the material to be subjected to greater pressure or to strains in these areas than in parts thereof at some distance from the edges or surface of the product. For this reason, it is often necessary to trim off as much as 10 per cent. or more of the material in order that the remaining product may be uniform throughout. The material trimmed off is largely waste since the binder with which the comminuted material is mixed has set. The resulting scrap cannot be used over again in producing high grade articles and has very little value.

In accordance with the present invention, this objection to previous practice is overcome by providing means for reducing friction between the material and the walls or other surfaces defining the shape forming passage through which the material is passed. Preferably one or more walls or portions of the material-contacting surface of the extrusion passage are movable so as to advance with the material as it is forced through the passage and in a preferred form of the invention the movable portion of the passage advances with the material when it is under the greatest pressure, but is retracted when the pressure on the material is reduced as when the plunger used to force the material through the passage is retracted preparatory to the introduction of additional material to be extruded.

One of the objects of the present invention is to improve the manufacture of extruded products and to avoid the lack of uniformity and imperfections in material due to differences in the pressure or movement of the material through an extrusion passage during an extrusion operation.

Another object of the invention is to provide apparatus for extruding materials wherein friction between the walls of the extrusion passage and the material being extruded is reduced.

Another object of the invention is to provide simple and inexpensive means for preventing or minimizing splitting or injury to the edges or other portions of sheets, rods, tubes and other forms of material produced by extrusion so that the losses incident to trimming such edges are eliminated.

A further object of the invention is to provide apparatus wherein the extrusion passage is provided with a wall or surface movable with the material as it is advanced and while it is under the greatest pressure so as to reduce the friction between the material and the wall or surface which it engages.

These and other objects and features of the invention will appear from the following description thereof in which reference is made to the accompanying figures of the drawing which illustrate typical embodiments of the invention as employed for extruding comminuted cork and a binder.

In the drawing:

Figure 1 is a vertical sectional view through a typical form of apparatus embodying the present invention.

Figure 2 is a perspective of portions of the apparatus illustrated in Figure 1 with parts thereof broken away, and Figure 3 is a sectional view of an extrusion passage of a form of mechanism adapted for use in producing tubular constructions in accordance with the present invention.

In that form of the invention chosen for purposes of illustration in Figures 1 and 2 of the drawing the apparatus embodies a die structure defining a passage 2 through which material to be formed is extruded and a plunger 4 slidable within the passage 2 to force material therethrough. The passage may be of any desired shape and size for forming material into sheets, rods, tubes or other forms and will of course be constructed to shape the material to produce the type of product desired. As shown in Figures 1 and 2 a passage of rectangular cross section is provided for producing sheet material and the plunger 4 is formed to correspond with the passage and therefore is also rectangular in cross section.

The upper and lower surfaces 6 and 8 of the passage 2 in this construction are flat and rigidly secured in place and may be formed of metal or other material in contact with which the mixture of comminuted material and binder may be moved by the plunger 4. The upper surface 6 of the passage 2 is provided with an opening 10 adjacent the rear thereof through which the material to be extruded is introduced into the passage. The opening 10 is located in advance of the rearmost position of the plunger 4 as shown in Fig. 1 so that when the plunger is retracted the opening 10 is uncovered and material may be supplied from a hopper 12 into the passage in advance of the plunger. A distributor 14, which is in the form of a rotatable member provided with teeth or projections 16, serves to feed the material to the opening 10 so that it will fill that portion of the passage adjacent the plunger when the plunger is retracted preparatory to forcing the material through the passage.

The passage 2 is also provided with a portion movable with the material as it is advanced therethrough. While any desired part of the material-contacting surfaces of the passage may be movable in this manner the construction illustrated in Figures 1 and 2 is provided with side walls 18 in the form of flat strips which are slidable longitudinally of the passage. The strips 18 which form the side walls preferably extend throughout the length of the passage and may extend beyond the ends thereof. The plunger 4 therefore moves between the strips 18 adjacent that end of the passage into which the material is introduced whereas the material is confined by the side walls until it has been advanced beyond the free end 20 of the extrusion passage.

The material when first introduced into the passage may be compressed considerably and therefore may be advanced a substantial distance into the passage, but this compression and the distance through which the material is advanced with each successive stroke and with successive additions of material will decrease until the material is advanced well into the extrusion passage. The distance which the material is moved will then become substantially constant particularly when the binder employed is set during the extrusion operation. The distance which the side walls are advanced with the material preferably is adjusted so as to be less than the stroke of the plunger and approximately equal to the distance through which the material is moved after it has advanced well into the passage or as it is forced from the free end thereof.

The means provided for actuating the movable surface or strips within the extrusion passage are also operated in timed relation to the operation of the plunger and as illustrated may be actuated by the plunger itself during a portion of its operating stroke, in order that the strips 18 may be moved only a relatively short distance corresponding to that through which the compressed material is moved while the plunger is moved a greater distance to force the material well into the passage. For this purpose a lost motion connection may be provided between the plunger and movable wall members as by providing the strips 18 with slots 22 into which extend projections 24 carried by blocks 26 secured to the rear of the plunger 4. The effective length of the slots 22 may be varied to alter the movement of the side walls by means of adjusting screws 28 carried by the strips 18 so that the stroke of the movable strips may be varied to correspond to the movement of the material under different operating conditions or when extruding different materials. Movement of the plunger forward to advance the material through the passage thus takes place without moving the side walls or strips 18 until the material within the passage has been compressed the desired amount or placed under the desired pressure. Thereafter the projections 24 engage the ends of slots 22 moving the strips 18 forward with the plunger and the material so that when the material is under the greatest pressure, the plunger, the material and the side walls of the passage all move forward together.

At the end of the forward stroke by which the material is advanced through the passage, the plunger is retracted moving the projections 24 rearwardly within the slots 22 in the strips 18 until the projections engage the ends of the adjusting screws 28. The strips are then retracted with the plunger and remain in their rearward position as shown in Fig. 1 until the plunger again is advanced to force the next increment of material into the passage 2 and bring the projections 24 again into engagement with the forward end of the slots 22. In this way, the side walls of the passage may remain stationary during the greater part or all of the compression portion of the plunger stroke and are only moved forward with the material after the desired compression has been attained and the whole body of material is advanced through the passage. Thereafter the side walls or strips 18 again remain stationary until the plunger 4 is moved rearwardly and the material relieved of the pressure exerted thereon by the plunger.

When the product being extruded is provided with a binder that is set by the application of heat, the passage 2 may be provided with a heating zone in the form of a steam chamber 30 which may be separated from that portion of the tube adjacent the plunger by a cooling zone provided by the water jacket 32 to prevent the binder from setting before the material is suitably compressed and strains in it distributed. A construction of this type is disclosed in the patent to Bond No. 1,453,617, dated May 1, 1923, but any other suitable form of apparatus of this general type may be used. In any case the intermittent movement of the side walls or slides 18 permits the material to become at least partially set after it is advanced into the heating zone and before the side walls are retracted. This delay in the rearward movement of the slides 18 together with the fact that the pressure exerted on the material by the plunger is released before the slides are retracted insures a minimum of friction and compression of the material along the edges thereof. The product produced is therefore of uniform character throughout and the losses and time required for trimming the material are eliminated.

While the construction of Figures 1 and 2 is directed to the formation of sheets or bodies of rectangular form, the invention may be used in producing articles of any desired form. As illustrated in Figure 3, the product may be extruded through a tubular passage 34 having a core or mandrel 36 in the center thereof to produce tubular products. In such constructions either the mandrel or the outer tube may be moved with the material as it is advanced. However, the mandrel may be moved more conveniently than the outer tube and therefore this construction is preferred. To this end the mandrel is provided with a slot 38 into which a projection 40 on the plunger 42 extends. The projection 40 rides in the slot in the mandrel without advancing the mandrel until it approaches the end of its forward movement. The projection then engages the forward end of the slot moving the mandrel forward with the plunger to the end of the forward stroke of the plunger. Thereafter as the plunger is retracted, it moves rearwardly without moving the mandrel until the projection on the plunger engages the opposite end of the slot 38. The mandrel is then moved rearwardly within the material preparatory to being advanced upon a further forward movement of the plunger.

In each of the forms of the invention described a portion of the surfaces engaged by the material is movable therewith as it is advanced and when it is under pressure so that friction between the material and the material-contacting surfaces of the passage is reduced as the material is advanced through the extrusion passage by the plunger. The retraction of the movable surface takes place only after the plunger has been retracted and the pressure released so that the strains which ordinarily produce splitting of the material at its edges or uneven compression thereof along marginal portions are eliminated. A product which is more nearly uniform in character and substantially free from marginal cracks and imperfections is therefore produced.

The form of the passage and of the surfaces which move with the material as it is advanced of course may be varied and will depend to a great extent on the character of the product to be produced. The means for actuating the movable surfaces and the timing and amount of their movement may also be varied to suit operating conditions and equipment. It should, therefore, be understood that the forms of the invention herein shown and described are intended to be illustrative of typical embodiments of the invention and are not intended to limit the scope thereof.

I claim:

1. Apparatus for forming material by extrusion comprising means forming a passage through which the material to be extruded is forced, means for advancing material through said passage and means for reducing the total friction between the material and the walls of the said passage during the advancing movement of said material, said means presenting a surface constituting a portion only of the walls of said passage and being movable with the material as it is advanced through said passage, and means for moving said friction-reducing means during a portion only of the advancing movement of the material.

2. Apparatus for forming material by extrusion comprising means forming a passage through which the material to be extruded is forced, a plunger movable within said passage for advancing material therethrough, and means for reducing the total friction between the material and the walls of said passage during the advancing movement of said material, said means presenting a surface constituting a portion only of the walls of said passage and being movable with the material as it is advanced through said passage by said plunger, and means for moving said friction-reducing means during a portion only of the advancing movement of the plunger.

3. Apparatus for forming material by extrusion comprising means forming a passage through which the material to be extruded is forced, a plunger movable within said passage for advancing material therethrough and means advanced by the plunger during a portion only of its advancing stroke presenting a surface forming a portion only of the walls of the passage for reducing the total friction between the material and said walls during the advancing movement of said material.

4. Apparatus for forming material by extrusion comprising means forming a passage through which the material to be extruded is forced, a plunger movable within said passage for advancing material therethrough, and means for reducing the total friction between the material and the walls of the said passage during the forward stroke of the plunger, presenting a surface constituting a portion only of the walls of said passage and movable in opposite directions with the plunger.

5. Apparatus for forming products by extrusion comprising means forming a passage, a plunger movable in said passage for advancing material therethrough, means for reducing the total friction between said material and the walls of said passage during the forward stroke of the plunger, said means presenting a surface in contact with material in said passage and actuating mechanism operatively connected with said plunged for moving said surface with the material while it is under pressure exerted by said plunger and for retracting said surface when the pressure exerted by said plunger is relieved.

6. Apparatus for forming material by extrusion comprising means forming a passage through which the material to be extruded is forced, a plunger movable within said passage for advancing material therethrough, means for reducing the total friction between the material and the walls of the said passage during the forward stroke of the plunger, presenting a surface constituting a portion only of the walls of said passage and a lost motion connection between the plunger and said means to move said means with the plunger during the final portion only of its stroke in each direction.

7. Apparatus for forming material by extrusion comprising means forming a passage through which the material to be extruded is forced, a plunger movable within said passage for advancing material therethrough, and means for reducing the total friction between the material and the walls of the said passage during the forward stroke of the plunger, said means presenting a surface constituting a portion only of the walls of said passage and a pin and slot connection between said plunger and said means for moving said means therewith during the final portion only of the stroke of the plunger in each direction.

8. Apparatus for producing products of rectangular cross section from comminuted material and a binder comprising means defining a passage of generally rectangular cross section having opposite walls thereof reciprocable with respect to the remaining walls of the passage, a plunger movable within said passage for advancing material therethrough, means for moving said movable walls with the material during a portion only of the stroke of said plunger, and means for returning said movable walls to their initial position in the interval between forward strokes of the plunger.

9. Apparatus for producing sheet products from comminuted material and a binder comprising means defining a passage having fixed upper and lower walls and lateral walls, said lateral walls including movable members for engaging material in the passage, and a plunger for forcing material through said passage, said movable members being movable with the material as it is advanced through the passage by the plunger and retractable during the return stroke of the plunger.

10. Apparatus for producing products of rectangular cross section from comminuted material and a binder comprising means defining a passage having fixed upper and lower walls, reciprocable strips extending along the sides of said passage and movable with the material as it is advanced through the passage, means for intermittently advancing material through said passage, and means for returning said strips to initial position.

11. Apparatus for producing sheet products from comminuted material and a binder comprising means defining a passage having fixed upper and lower walls, strips extending along the sides of said passage and movable with the material as it is advanced through the passage, a plunger for forcing material through said passage and means connecting said strips and plunger for retracting said strips when said plunger is retracted.

12. Apparatus for producing sheet products from comminuted material and a binder comprising means defining a passage having fixed upper and lower walls, means extending along the marginal edges of said passage and movable with the material as it is advanced through the passage for reducing the friction between the material and the side walls of said passage, a plunger for forcing material through said passage and a pin and slot connection between said plunger and said means for moving said means with the plunger during a portion only of the stroke of said plunger.

13. Apparatus for producing sheet products from comminuted material and a binder comprising means defining a passage having fixed upper and lower walls, strips extending along the sides of said passage and movable with the material as it is advanced through the passage, a plunger for forcing material through said passage, a pin and slot connection between said plunger and said strips for moving said strips with the plunger during a portion only of the stroke of said plunger and means for adjusting the effective length of said slot to vary the distance said strips are moved with the plunger.

14. Apparatus for forming products from comminuted material and a heat setting binder comprising means defining a passage, means for introducing comminuted material and a binder into said passage, a reciprocating plunger for forcing the comminuted material and binder together through said passage and into engagement with the walls of said passage, means for heating material in said passage to cause said binder to set and means constituting a portion only of the walls of said passage movable with the material as it is advanced through said passage, and means for returning said movable means to initial position between forward strokes of the plunger.

15. Apparatus for forming products from comminuted material and a heat setting binder comprising means defining a passage, means for introducing comminuted material and a binder into said passage, a plunger for forcing the comminuted material and binder through said passage and into engagement with the walls of said passage, means for heating material in said passage to cause said binder to set and means constituting a portion only of the walls of said passage movable with the material as it is advanced through said passage, said means extending beyond said heating means on each side thereof and operatively connected to said plunger to move therewith during a portion only of its stroke in each direction.

16. Apparatus for producing tubular products from comminuted material and a binder comprising means defining a tubular passage, a movable mandrel therein, a reciprocating plunger for forcing material through said passage and about said mandrel and means for moving said mandrel during a portion only of the advancing stroke of the plunger.

17. Apparatus for producing tubular products from comminuted material and a binder comprising a tube having a movable mandrel therein, a cylindrical plunger for forcing material through said tube and about said mandrel and means establishing a loose connection between said plunger and said mandrel whereby the mandrel is movable with the plunger through a portion only of the stroke of said plunger.

18. Apparatus for forming material by extrusion thereof comprising fixed and movable members defining an extrusion passage, means for advancing material through said passage, and means movable with respect to said fixed members for advancing said movable members with said material during a portion only of the advancing movement of said material.

19. Apparatus for forming material by extrusion thereof comprising fixed and movable members defining an extrusion passage, a plunger for advancing material through said passage, and means movable with said plunger for advancing said movable members with said material during a portion of the advancing movement of said plunger and for retracting said members in the interval between forward strokes of the plunger.

20. Apparatus for forming material by extrusion comprising means defining a shape-forming passage through which the material to be extruded is forced, means for advancing material through said passage, means for reducing the total friction between the material and the material-contacting surfaces of said passage, said friction-reducing means including a portion of the material-contacting surfaces of said passage and being movable with the material as the material advances through the passage, and means for moving said friction-reducing means during a portion only of the advancing movement of the material.

21. Apparatus for producing extruded products comprising means defining a shape-forming passage, a plunger for advancing material to be extruded through said passage and means, advanced during a portion only of the advancing stroke of the plunger and including a portion of the material-contacting surfaces of said passage, for reducing the total friction between the material and the material-contacting surfaces of said passage during the advancing movement of the material.

22. Apparatus for forming material by extrusion comprising a die having a shape-forming passage through which the material to be extruded is forced, means for intermittently advancing material through the die and means, advanced with the material during a portion only of the advancing movement of said material and including a portion of the material-contacting surfaces of said passage, for reducing the total friction between the material and the material-contacting surfaces of said passage during he advancing movement of said material.

GEORGE P. EDMONDS.